(12) United States Patent
Linkous et al.

(10) Patent No.: US 6,248,218 B1
(45) Date of Patent: Jun. 19, 2001

(54) CLOSED CYCLE PHOTOCATALYTIC PROCESS FOR DECOMPOSITION OF HYDROGEN SULFIDE TO ITS CONSTITUENT ELEMENTS

(76) Inventors: Clovis A. Linkous, 1210 Old Parsonage Dr., Merritt Island, FL (US) 32952; Nazim Z. Muradov, 1250 Bonaventure Dr., Melbourne, FL (US) 32940

(*) Notice: Subject to any disclaimer, the term of this patent is extended or adjusted under 35 U.S.C. 154(b) by 0 days.

(21) Appl. No.: 09/375,967

(22) Filed: Aug. 17, 1999

Related U.S. Application Data
(60) Provisional application No. 60/126,036, filed on Mar. 25, 1999.

(51) Int. Cl.[7] .............................. C01B 17/00; C01B 3/00
(52) U.S. Cl. ............................... 204/157.49; 204/157.52
(58) Field of Search ........................ 204/157.15, 157.3, 204/157.49, 157.52, 158.2

(56) References Cited

U.S. PATENT DOCUMENTS

| | | | |
|---|---|---|---|
| 3,781,194 | 12/1973 | Juillet et al. | 204/162 R |
| 4,602,988 | * 7/1986 | Kolts | 204/157.52 |
| 4,769,504 | 9/1988 | Noceti et al. | 585/415 |
| 4,917,784 | 4/1990 | Shelnutt | 204/157.6 |
| 5,019,652 | 5/1991 | Taylor et al. | 562/549 |
| 5,104,504 | 4/1992 | Tanaka et al. | 204/157.9 |
| 5,211,923 | 5/1993 | Harness et al. | 423/220 |
| 5,480,524 | 1/1996 | Oeste | 204/158.2 |
| 5,689,798 | 11/1997 | Oeste | 422/186.3 |
| 5,720,858 | 2/1998 | Noceti et al. | 204/157.6 |

OTHER PUBLICATIONS

Linkous, "Photocatalytic Production of Hydrogen from Hydrogen Sulfide Using Semiconductor Particulates", Hydrogen Energy Prog. X, Proc. World Hydrogen Energy Conf., 10th, vol. 2, pp. 755–762, 1994.*

Linkous, "Photocatalytic Recycling of H2 in Hydrodesulfurization", Symposium on Recent Advances in Heteroatom Removal Presented Before the Division of Petroleum Chemistry, Inc., 215th National Meeting, American Chemical Society, Dallas, TX, pp. 101–104, Mar. 1998.*

Li et al., "Hydrogen Production by H2S Photocatalytic Decomposition", New J. Chem., vol. 16, pp. 517–519, 1992.*

Savinov et al., "Suspensions of Semiconductors with Microheterojunctions—A New Type of Highly Efficient Photocatalyst for Dihydrogen Production from Solution of Hydrogen Sulfide and Sulfide Ions", Int. J. Hydrogen Energy, vol. 14, No. 1, pp. 1–9, 1989.*

Suspensions of Semiconductors with Microheaterojunctions–A New Type of Highly Efficient Photocatalyst for Dihydrogen Production from Solution of Hydrogen Sulfide and Sulfide Ions, E.N. Savinov, et al., int. J. Hydrogen Energy, vol. 14, No. 1, pp. 1–9, 1989 no month available.

(List continued on next page.)

Primary Examiner—Edna Wong

(57) ABSTRACT

A method and system for separating hydrogen and sulfur from hydrogen sulfide($H_2S$) gas being produced from oil and gas waste streams. The hydrogen sulfide($H_2S$) gas is first passed into a scrubber and filtration unit where it encounters polysulfide solution. Elemental sulfur is freed when the $H_2S$ interacts with the solution, the sulfur is filtered through a porous media such as a ceramic frit, and continues to a stripper unit where the excess $H_2S$ is removed from the sulfide solution. The excess $H_2S$ returns to the scrubber and filtration unit, while the sulfide solution passes into a photoreactor containing a semiconductor photocatalyst such as Cadmium Sulfide(CdS), Platinized Cadmium Sulfide, Pt-CdS, Zinc Sulfide, ZnS, Zinc Ferrate, $ZnFe_2O_4$, Indium Sulfide, $In_2S_3$, along with a 450–500 nm light source.

12 Claims, 3 Drawing Sheets

OTHER PUBLICATIONS

Hydrogen Production by H2S Photocatalytic Decomposition, Shuben Li and Gongxuan Lu, New Journal of Chemistry, vol. 16, No. 4, pp. 517–519, 1992 no month available.

Photochemical Hydrogen Production with Cadmium Sulfide Suspensions, Niklaus Bühler, et al., Journal of Physical Chemistry, vol. 88, No. 15, pp. 3261–3268, 1984 no month available.

Silica–Supported ZnS*CdS Mixed Semiconductor Catalysts for Phtogeneration of Hydrogen, A. Ueno, et al., Journal of Physical Chemistry, vol. 89, No. 18, pp. 3828–3833, 1985 no month available.

Recovery of Hydrogen from Hydrogen Sulfide, edited by Theodore F. Schoenborn, The RIB–IT Views—Thirty–eight Model Technology Assessments and Partnership Opportunities, pp. 254–259, c. 1996–'97 no month available.

Photocatalytic Recycling of H2 in Hydrodesulfurization, Clovis A. Linkous, Symposium on Recent Advances in Heteroatom Removal, Dallas, TX., Mar. 29–Apr. 3, 1998.

* cited by examiner

CLOSED CYCLE PHOTOCATALYTIC PROCESS FOR DECOMPOSITION OF HYDROGEN SULFIDE TO ITS CONSTITUENT ELEMENTS

This invention relates to sulfur recovery from oil and gas refinery waste streams, and in particular to a method and apparatus for sulfur recovery from oil and gas refinery waste streams using semiconductor particulates, where hydrogen sulfide($H_2S$) having been absorbed into an alkaline solution is decomposed in a photochemical scheme to yield both sulfur and hydrogen which can be later sold or used internally at a refinery and claims the benefit of priority of Provisional Application 60/126,036 filed on Mar. 25, 1999, by the same inventors thereof.

BACKGROUND AND PRIOR ART

Oil refineries typically pump crude oil from the ground which contains unusable organic sulfur, the latter of which must be separated from the crude oil in order to allow the oil to become a useful product. Typically, the pumped crude oil is treated with hydrogen and a catalyst under a high temperature which decomposes the organic sulfur in the crude oil and releases the sulfur in the form of hydrogen sulfide ($H_2S$) gas. The problem is what do the refineries do with the $H_2S$ gas, which is a noxious poisonous gas that cannot be released into the atmosphere.

Recent environmental regulations generally require oil and gas refineries to develop waste minimization technologies for the treatment of sulfur-containing compounds, such as hydrogen sulfide($H_2S$) within their facilities. Current technology typically requires a solvent absorption and stripping process to separate the acid gases, a Claus type reactor to perform a partial oxidation of the sulfide to make elemental sulfur and water and a tertiary gas treatment. The latter of which having specifics that can vary greatly but must effect at least another hundred-fold reduction in $H_2S$ concentration.

Currently refineries must now go out and buy or make hydrogen to perform hydrodesulfurization. Afterwards, the resultant $H_2S$ must then be decomposed at the plant.

As the world supply of petroleum decreases, the average sulfur content of crude oil has begun to rise. In recent years the average oil refinery has gone from being a net producer to a net consumer of $H_2$. The oil producers would thus be interested in any process that increases the amount of $H_2$ available in-house.

SUMMARY OF THE INVENTION

A primary objective of the present invention is to provide a method of recovering sulfur from oil and gas refinery waste streams using semiconductor particulates, where hydrogen sulfide($H_2S$) having been absorbed into an alkaline solution is decomposed in a photochemical process to yield both sulfur and hydrogen.

The secondary objective of the present invention is to decompose noxious poisonous gas such as hydrogen sulfide into separate amounts of hydrogen and sulfur using light and a photocatalyst.

A third objective is to recoup the $H_2$ contained in $H_2S$ and return it to the hydrodesulfurization plant for reuse in oil refinery applications.

A preferred embodiment of the novel process decomposes $H_2S$ in a thermodynamically uphill process to its constituent elements:

$$H_2S + light \rightarrow S + H_2$$

The energy to drive the reaction can either come from the sun or an artificial light source. The decomposition process is photoelectrochemical in nature, in which the photovoltaic effect from semiconductor solid state physics is combined with conventional electrochemical principles to produce a light-driven electrochemical reactor using semiconductor electrodes. Thus, we call it the PEP(photoelectrochemical particle) process.

In the preferred embodiment, $H_2S$ from the stripper is passed into an alkaline solution to produce bisulfide ion, $HS^-(aq)$. The sulfide solution is then sent into a photoreactor, which consists of a bed of catalyst-activated semiconductor particles such as Cadmium Sulfide(CdS), distributed in a thin, planar or cylindrical array depending on the lamp configuration, and a light source containing a wavelength range of approximately 450 to approximately 500 nm. As the solution is passed over the surface of the photo-energized semiconductor particles, bisulfide ion is oxidized and water is reduced to sulfur and hydrogen, respectively. Other photo-catalysts useful can include as Platinized Cadmium Sulfide, Pt-CdS, Zinc Sulfide, ZnS, Zinc Ferrate, $ZnFe_2O_4$, and Indium Sulfide, $In_2S_3$ The exit stream from the photoreactor will contain sulfur in the form of polysulfide ion, which results when sulfur is produced in the presence of excess bisulfide ion:

$$HS^- + (n-1)S^0 + OH^- = S_n^{2-} + H_2O$$

The polysulfide solution is returned to the scrubber tank, where pressurizing with $H_2S$ causes the sulfur to become separated from solution.

The following chemical process shows the effects of combining sulfur recovery and scrubber units, utilizing the acid properties of $H_2S$ itself to decompose polysulfide ions and free the elemental sulfur.

$$S_n^{2-} + H_2S = (n-1)S^0 + 2HS^-$$

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
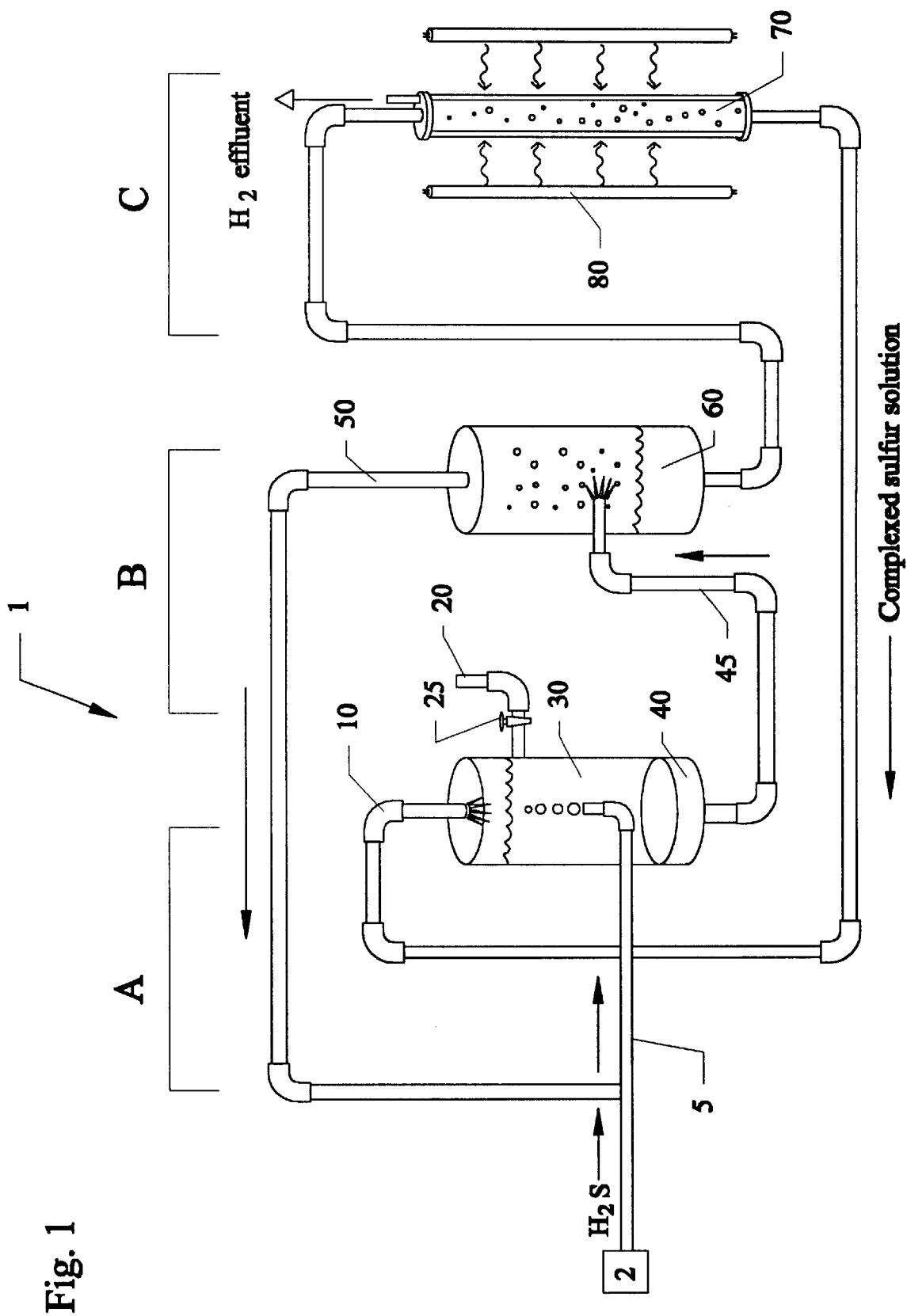
FIG. 1 is a layout of the photoelectrochemical particle (PEP) process for $H_2S$ decomposition for sulfur recovery.

FIG. 1 is a layout system 1 of the photoelectrochemical particle(PEP) process for $H_2S$ decomposition for sulfur recovery. The system 1 consists of three major units: A, the scrubber and filtration apparatus; B, an outgassing stripper unit such as an $H_2S$ stripper, and the like; C, the photoreactor. The scrubber used would be akin to a wet scrubber used in gas cleaning applications such as but not limited to the scrubber unit used in U.S. Pat. No. 5,211,923 to Harkness et al., which is incorporated by reference. Hydrogen sulfide H$_2$S, coming from a source 2 such as a hydrodesulfurization plant, a sour natural gas well and the like, is bubbled into scrubber and filtration apparatus A, by line 5 where it encounters polysulfide solution 10 coming from photoreactor 70. An outlet 20 with control valve 25 is in place to maintain an overpressure of H$_2$S in the head space and to function as a pressure relief valve. The H$_2$S lowers the pH of the scrubber vessel solution 30, to approximately 7.0 to approximately 7.5, whereupon the polysulfide anion decomposes, freeing elemental sulfur, S$^0$. The sulfur is collected by filtration 40 of the suspension through a porous material such as ceramic frit, and the like.

The filtrate continues by line 45 into the stripper unit B, where the excess H$_2$S is removed from the sulfide solution. The pH of the solution rises to the 10 to 12 range, depending on the extent of H$_2$S removal. The H$_2$S is returned through line 50 to the foreline of the scrubber unit A, while the sulfide solution 60 is fed to the photoreactor C containing immobilized photocatalyst. The sulfide solution inside the photoreactor 70, consisting mainly of bisulfide ion, HS$^-$, is oxidatively converted to elemental sulfur and then complexed with excess bisulfide ion to make polysulfide ion, S$_n^{2-}$, while water is reduced to make H$_2$, under the action of light source 80. The photocatalyst can be a platinized cadmium sulfide, Pt-CdS. See for example N. Buhler, et al., Photochemical Hydrogen Production with Cadmium Sulfide Suspensions, J. Phys. Chem., Vol. 88(1984) pp.3261. Other photocatalysts such as zinc sulfide, ZnS, zinc ferrate, ZnFe$_2$O$_4$, indium sulfide, In$_2$S$_3$, and the like would also additionally have a photocatalytic effect on H$_2$S . See Ueno et al., Silica-Supported ZnS Cds Mixed Semiconductor Catalysts for Photogeneration of Hydrogen, J.Phys.Chem, 89(1985), pp. 3828; Li et al., Hydrogen Production by H2S Photocatalytic Decomposition, New J. Chem., 16(1992) pp. 517; and Savinov et al., Suspensions of Semiconductors With Microheterojunctions-A New Type of Highly Efficient Photocatalyst For Dihydrogen Production From Solution of Hydrogen Sulfide and Sulfide Ions, Int. J. Hydrogen Energy, 14(1989) pp. 1.

Any broadband visible light source such as a low pressure mercury fluorescent lamp or a tungsten filament bulb, would provide some excitation energy for the photocatalytic reaction. Light sources concentrating their irradiance between approximately 450 to approximately 500 nm would be most effective. This is due to the spectral window created by the absorption edge of the CdS photocatalyst on the low energy side and the absorption edge of the background polysulfide solution on the high energy side. Examples of such light sources would be Zn, and Cd spectral lamps and certain special blue fluorescent lamps.

Referring to FIG. 1, the H$_2$ gas percolates out the top of the photoreactor C, while the polysulfide solution is returned to the scrubber unit B. H2 is releases out of the top of the photoreactor, underneath "C". The sulfur is shown as being collected by filtration. Use of a settling tank would also be an alternative. Either way, the sulfur is a solid and would have to be collected by opening up the system. Additionally, the sulfur can be melted and collected in molten state.

It would be important to include excess base to keep pH high and facilitate photocatalytic reaction, since the photooxidation of HS$^-$ requires OH$^-$ as a co-reactant. As previously described a light source having maximum wavelength range of between approximately 450 to approximately 500 nm is needed to penetrate the disulfide solution while remaining within the spectral envelope of CdS. Use of a reasonably strong acid such as HCl, H$_2$SO$_4$, H$_3$PO$_4$ can be used to precipitate sulfur from polysulfide solution. From a material supply and cost point of view, it would be desirable to use H$_2$S(hydrogen sulfide) as the acidic agent.

Figure 2:
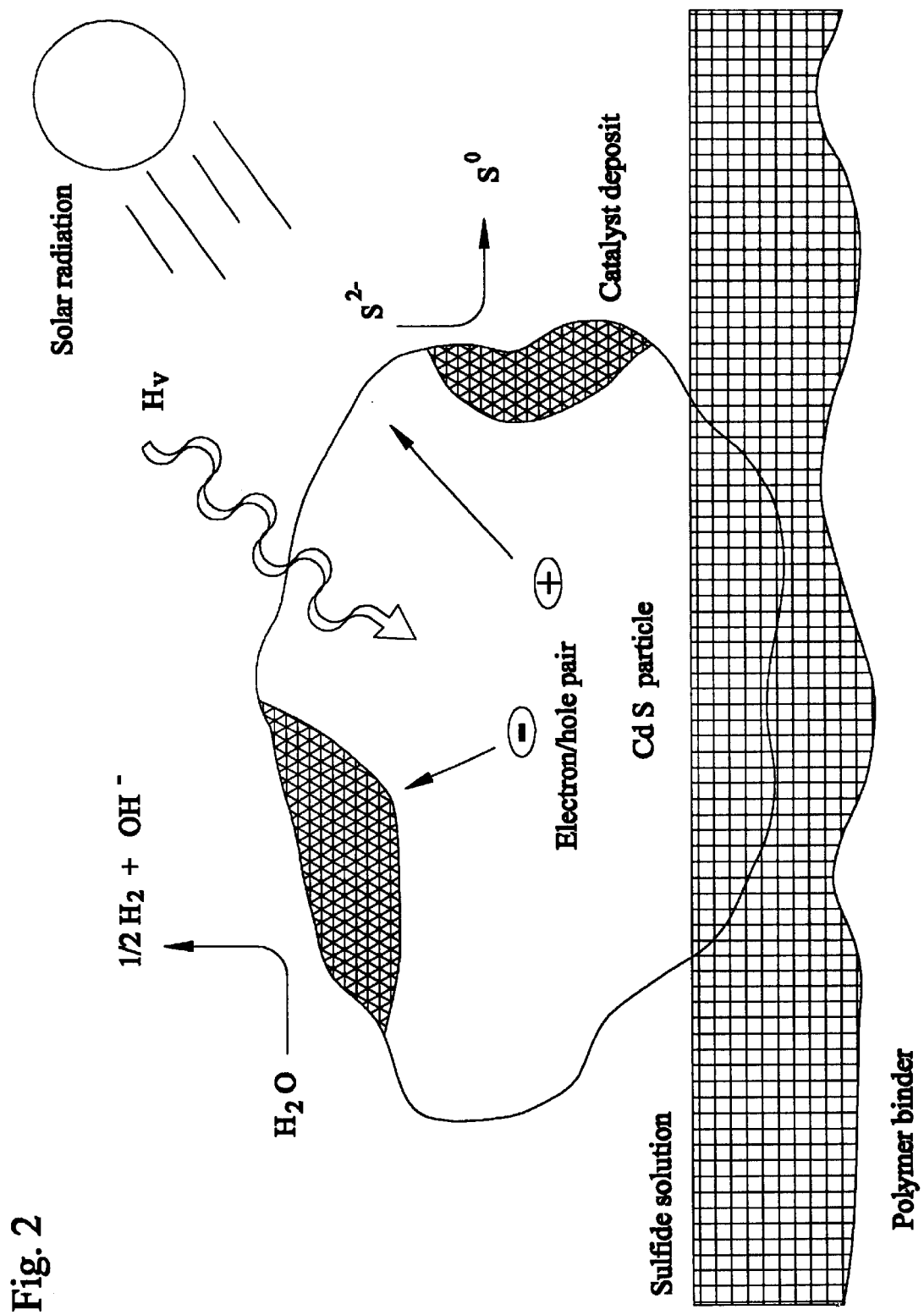
FIG. 2 shows how a semiconductor particle works for sulfur recovery.

FIG. 2 shows how a semiconductor particle works for sulfur recovery. FIG. 2 shows the operation of a photocatalytic particle as it would apply to hydrogen sulfide decomposition. The photoparticle is immobilized in a polymer binder and subjected to an ultraviolet(UV) visible radiation source such as sunlight, and the like. Absorption of a photon of light whose energy is greater than the band gap energy of the photocatalytic material results in the creation of an electron/hole pair. The pair represents positive and negative charge carriers that can move independently of each other. Both carriers can be capable of charge transfer into the surrounding solution. The free electron represents reducing, or electron-donating power, while the hole represents oxidizing, or electron accepting, power. Because of the small particle size(on the order of approximately 1 um) the charge carriers can quickly migrate to the particle/electrolyte interface. The electron serves to reduce water to H$_2$ gas and hydroxide ion, while the hole serves to oxidize sulfide or bisulfide ion, depending on the solution pH, to elemental sulfur.

Figure 3:
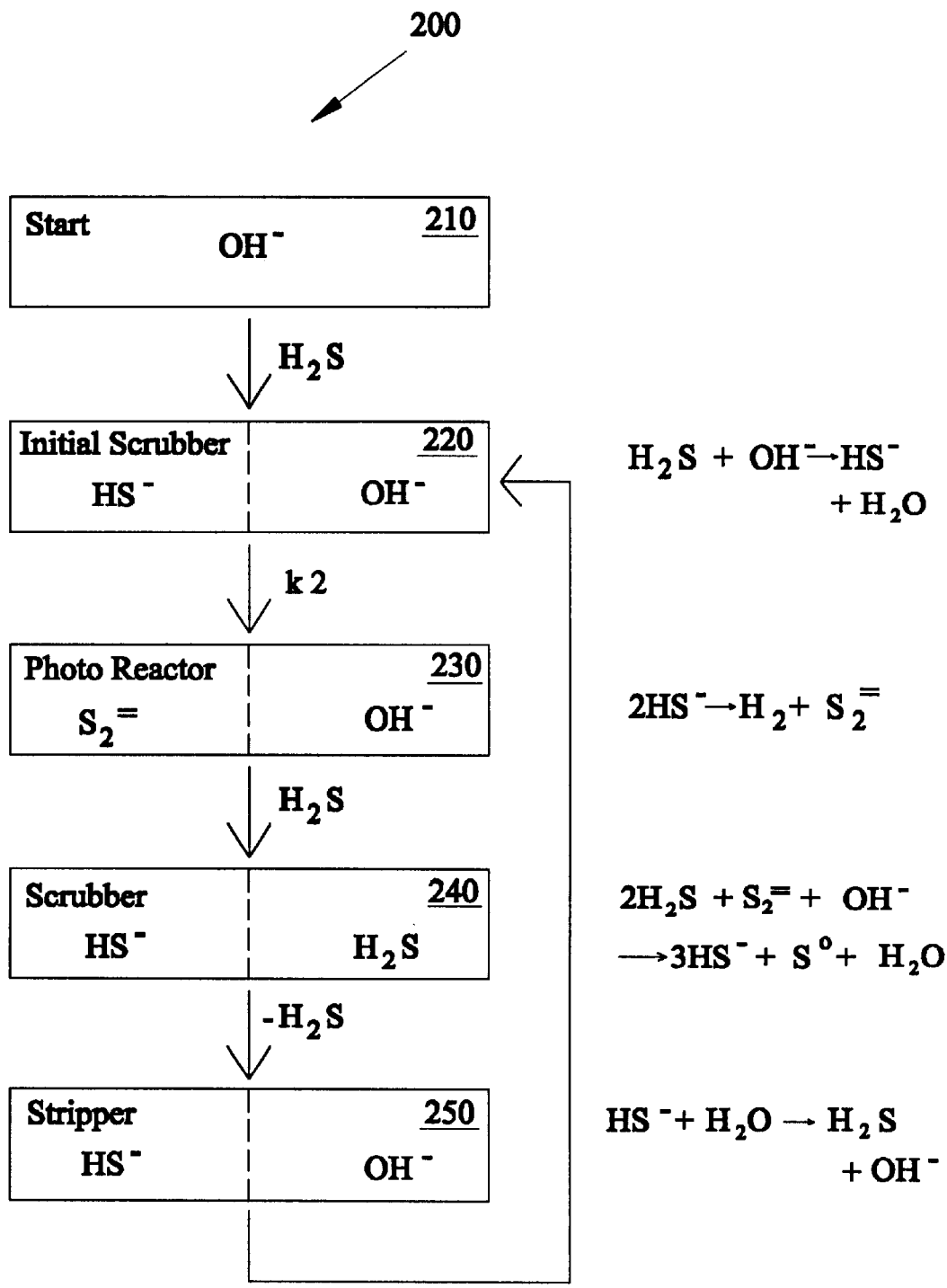
FIG. 3 shows a flowchart of the chemical formula reaction occurring in the layout of FIG. 1.

FIG. 3 shows a flowchart of the chemical formula reaction occurring in FIG. 1. The process chemistry associate with each part of the PEP process is shown in FIG. 3. For the system start-up, the scrubber contains only caustic solution, representing some background OH$^-$ concentration (210). Hydrogen sulfide is introduced (220), generating HS$^-$ and eliminating half of the OH$^-$ion H$_2$S. This solution then goes to the photoreactor, where light absorption by the photocatalyst converts bisulfide ion to bisulfide ion, S$_2^-$(230). The resultant solution returns to the scrubber, where pressurization by H$_2$S results in the reverse conversion plus the precipitation of elemental sulfur, S$^0$ (240). Stripping away the excess H$_2$S raises pH and regenerates the initial balance of bisulfide and hydroxide ion(250).

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of recovering sulfur from hydrogen sulfide (H$_2$S) waste streams using a photochemical process in a closed cycle system with semiconductor photocatalyst particulates, comprising the steps of:

(a) producing hydrogen sulfide (H$_2$S) having a first pH level;

(b) raising the first pH level of the hydrogen sulfide(H$_2$S) to a second pH level being higher than the first pH level;

(c) interacting the hydrogen sulfide having the second pH level with a photocatalyst particulate; and (d) applying light to the photocatalyst particulate and the hydrogen sulfide to separate hydrogen from sulfur; and (e) recycling steps (a), (b), (c) and (d), so that the separated hydrogen can be recycled in a closed cycle system.

2. The method of recovering sulfur of claim 1, wherein step(a) further includes:

a source chosen from at least one of:
an oil refinery, a gas refinery, a hydrodesulfurization plant, or a sour natural gas well.

3. The method of recovering sulfur of claim 1, wherein the photocatalyst includes:
Cadmium Sulfide(CdS).

4. The method of recovering sulfur of claim 1, wherein the photocatalyst includes:
Platinized Cadmium Sulfide(Pt-CdS).

5. The method of recovering sulfur of claim 1, wherein the photocatalyst includes:
Zinc Sulfide(ZnS).

6. The method of recovering sulfur of claim 1, wherein the photocatalyst includes:
Zinc Ferrate($ZnFe_2O_4$).

7. The method of recovering sulfur of claim 1, wherein the photocatalyst includes:
Indium Sulfide($In_2S_3$).

8. The method of recovering sulfur of claim 1, wherein step (d) includes:
a light source having a wavelength of approximately 450 to approximately 500 nm.

9. The method of recovering sulfur of claim 1, wherein the raising the first pH level of the hydrogen sulfide($H_2S$) of step(b) further includes the step of:
applying a polysulfide solution to the hydrogen sulfide ($H_2S$) to form a scrubber solution;
removing a portion of hydrogen sulfide($H_2S$) from the scrubber solution to form a sulfide solution.

10. The method of recovering sulfir of claim 9, wherein the raising the first pH level of the hydrogen sulfide($H_2S$) of step(b) further includes the step of:
removing excess hydrogen sulfide ($H_2S$) from the sulfide solution prior to step (c) so that the sulfide solution consists mainly of bisulfide ion.

11. The method of recovering sulfur of claim 1 wherein the first pH level of the hydrogen sulfide($H_2S$) has a range of approximately 7 to approximately 7.5, and the second pH level of the hydrogen sulfide($H_2S$) has a range of approximately 10 to approximately 12.

12. A method of decomposing hydrogen sulfide($H_2S$) to sulfur(S) and hydrogen($H_2$) in a closed cycle system, comprising the steps of:
(a) producing hydrogen sulfide ($H_2S$) having a first pH level;
(b) passing the hydrogen sulfide ($H_2S$) having the first pH level into a polysulfide solution to form a sulfide solution having bisulfide ions, the sulfide solution having a second pH level being higher than the first pH level;
(c) interacting the sulfide solution having the second pH level with a photocatalyst particulate;
(d) applying light to the photocatalyst particulate and the sulfide solution to separate sulfur from hydrogen and form the polysulfide solution; and
(e) recycling the polysulfide solution into step (a) to repeat in a closed cycle system.

* * * * *